(12) United States Patent
Moguillansky

(10) Patent No.: US 9,560,308 B2
(45) Date of Patent: Jan. 31, 2017

(54) APPLYING MOTION BLUR TO ONLY SELECT OBJECTS IN VIDEO

(75) Inventor: Jeffrey Moguillansky, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 770 days.

(21) Appl. No.: 13/357,808

(22) Filed: Jan. 25, 2012

(65) Prior Publication Data

US 2013/0188931 A1    Jul. 25, 2013

(51) Int. Cl.

| | |
|---|---|
| H04N 9/80 | (2006.01) |
| H04N 5/92 | (2006.01) |
| H04N 5/93 | (2006.01) |
| H04N 5/228 | (2006.01) |
| H04N 5/783 | (2006.01) |
| H04N 5/917 | (2006.01) |
| H04N 5/76 | (2006.01) |
| H04N 5/85 | (2006.01) |
| H04N 9/804 | (2006.01) |
| H04N 21/431 | (2011.01) |
| H04N 21/4728 | (2011.01) |

(52) U.S. Cl.
CPC ............... *H04N 5/76* (2013.01); *H04N 5/783* (2013.01); *H04N 5/85* (2013.01); *H04N 9/8042* (2013.01); *H04N 21/4318* (2013.01); *H04N 21/4728* (2013.01)

(58) Field of Classification Search
CPC .... H04N 5/85; H04N 1/2112; H04N 5/23248; H04N 5/23254; H04N 5/23258; H04N 5/783; H04N 9/7921; H04N 9/8042; G11B 27/005; G11B 27/34

USPC ........... 386/248, 224, 328, 343, E5.07, 280, 386/E5.028; 348/208.4, E5.031; 375/240.26

See application file for complete search history.

(56) References Cited

U.S. PATENT DOCUMENTS

| | | |
|---|---|---|
| 5,343,241 A | 8/1994 | Richards et al. |
| 5,627,915 A | 5/1997 | Rosser et al. |
| 6,233,007 B1 | 5/2001 | Carlbom et al. |
| 7,084,875 B2 | 8/2006 | Plante |
| 7,103,231 B2 | 9/2006 | Comog |
| 2005/0180510 A1* | 8/2005 | Togita ...................... 375/240.26 |
| 2005/0254011 A1 | 11/2005 | Weisgerber |
| 2008/0260369 A1 | 10/2008 | Ibaraki |
| 2008/0278610 A1 | 11/2008 | Boettiger |
| 2009/0003652 A1 | 1/2009 | Steinberg et al. |
| 2009/0027494 A1 | 1/2009 | Cavallaro et al. |
| 2009/0027500 A1 | 1/2009 | Elangovan et al. |
| 2009/0054142 A1 | 2/2009 | Kaku et al. |
| 2009/0179898 A1 | 7/2009 | Bond |

(Continued)

FOREIGN PATENT DOCUMENTS

CN        101540801        2/2010

*Primary Examiner* — Thai Tran
*Assistant Examiner* — Syed Hasan
(74) *Attorney, Agent, or Firm* — John L. Rogitz; John M. Rogitz

(57) ABSTRACT

Motion blur is applied to select objects in a video, e.g., to footballs in flight or to a tennis ball during a tennis match. Motion blur is applied only to the tennis ball, rather than the entire screen, or only to the football. If desired, the TV can also increase the contrast or apply a glow around the object of interest so that the user can have an easier time tracking the object of interest. Should the user pause a sports broadcast at any frame or play in slow motion, the position of the object in the trick play format is interpolated as being the center position of the motion-blurred image.

18 Claims, 2 Drawing Sheets

(56) References Cited

U.S. PATENT DOCUMENTS

| | | |
|---|---|---|
| 2009/0268987 A1 | 10/2009 | Tsuda et al. |
| 2010/0026880 A1 | 2/2010 | Ito et al. |
| 2010/0149184 A1 | 6/2010 | Pepper et al. |
| 2010/0214422 A1 | 8/2010 | Iwamura et al. |
| 2011/0096179 A1* | 4/2011 | Border et al. ............. 348/208.4 |
| 2012/0207452 A1* | 8/2012 | Wang et al. ................. 386/280 |

* cited by examiner

APPLYING MOTION BLUR TO ONLY SELECT OBJECTS IN VIDEO

I. FIELD OF THE INVENTION

The present application relates generally to applying motion blur to only select objects in video.

II. BACKGROUND OF THE INVENTION

U.S. Pat. No. 5,343,241, incorporated herein in its entirety by reference, describes a method for increasing motion blur in video, i.e., for doing what normally is sought to be avoided by making entire video streams appear to be distorted by motion, as occurs when, for instance, a slow speed shutter is used to image an airplane. The reason the entire video in the referenced patent is blurred is to make it possible to use a relatively simple shutter for both sports-type scenes with a short integration period owing to greater frame rates and narrower shutter angles, and with drama-type scenes that usually have longer integration periods owing to wider shutter angles and also potentially slower shutter speeds. Thus, the referenced patent simulates the acquisition of video with a different integration period than that actually used.

As understood herein, the principles of the referenced patent may also be used for an application that is taught away from by the purpose of the referenced patent, which is, recall, to make an entire video appear to be captured with a different integration period than that actually used.

SUMMARY OF THE INVENTION

Specifically, present principles do not seek to alter an entire video scene to make it appear as though it were shot with a different integration period than that actually used, but rather to alter only select portions of the scene to impart a visually appealing highlight to the select portions.

Accordingly, a system includes a video display and a processor controlling the display and configured to execute logic to distort an appearance of at least one object presented in video on the display. According to present principles, the processor is programmed to execute logic which includes identifying at least one object in the video having motion satisfying a threshold, and distorting an appearance of the object to simulate high speed motion thereof responsive to a determination that the motion of the object satisfies the threshold. Appearances of objects in the video whose motions do not satisfy the threshold are not distorted.

In example embodiments, the processor identifies objects in the video by matching objects to at least one template object. In other embodiments the processor identifies objects in the video on the basis of having closed peripheries of any shape. Yet again, the processor may identify objects in the video by identifying groups of pixels having identical motion vectors, inferring that such groups of pixels are moving in unison at the same speed and direction and thus represent a discrete single object.

In any case, as set forth further below in connection with example implementations, the may processor determine that an object in the video has motion satisfying the threshold by determining that the object has a motion vector with a magnitude at least equal to a threshold magnitude. Responsive to determining that at least one object has a motion satisfying the threshold, the processor may determine whether multiple objects are moving sufficiently fast to merit motion blur application, and responsive to a determination that only a first object is found to satisfy the threshold, motion blur is applied to the first object and not to other objects in the video. If desired, the amount of motion blurring can be varied according to a velocity of the first object, such that the first object when moving with a speed just at the threshold has a first, relatively small motion blur effect applied, and the first object when moving with a speed above the threshold has a second, relatively large motion blur effect applied.

In non-limiting examples, responsive to determining that at least one object has a motion satisfying the threshold, the processor increases a contrast of a periphery of the object, or causes the object to have a glowing appearance, or both increases the contrast of the periphery of the object and causes the object to have a glowing appearance. In some embodiments, responsive to a determination that a trick play command to stop or slow playback to slower than normal playback is received, the processor removes motion blurring of the first object. In illustrative non-limiting examples, responsive to a determination that a trick play command to stop or slow playback to slower than normal playback is received, the processor determines a position of the object to be an interpolated position for display of the object at the interpolated position.

In another aspect, a method includes presenting, on a video display, a first moving object, and presenting on the video display, a second moving object. The second moving object moves with motion vectors indicating that the second moving object is moving at a second speed less than a threshold speed, while the first moving object moves at a first speed faster than the threshold speed. The method further includes blurring an image of the first moving object but not blurring the image of the second moving object responsive to a determination of a relationship between the threshold speed and first and second speeds.

In another aspect, a video display apparatus includes a video display and a processor controlling the display and applying motion blur to at least one select object in a video presented on the display but not applying motion blur to objects in the video other than the select object.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

For the reader's convenience, relevant principles of the referenced patent are first summarized before describing present principles. In the referenced patent, an input digital video signal having input frames and a motion blur characteristic is processed by producing at least two intermediate frames or fields by motion compensated temporal interpolation between adjacent input frames, with a pair of the intermediate frames or fields having complementary interpolation ratios relative to said adjacent input frames. Two or more frames or fields are then combined. The frames can be adjacent input frames and two intermediate frames or fields to form an output frame having a motion blur characteristic greater than the motion blur characteristic of the adjacent input frames.

As described in further detail in the referenced patent, the values of corresponding pixels in the intermediate frames can be averaged to form the pixels of the output frame. Also, the intermediate fields can be interlaced to form an output frame. This interlacing may include interlacing an intermediate field with an opposite polarity field of one of the pair of input fields to form the output frame. Variations of these modes can be selected in dependence upon a maximum speed of motion in an image represented by the input frames.

Figure 1:
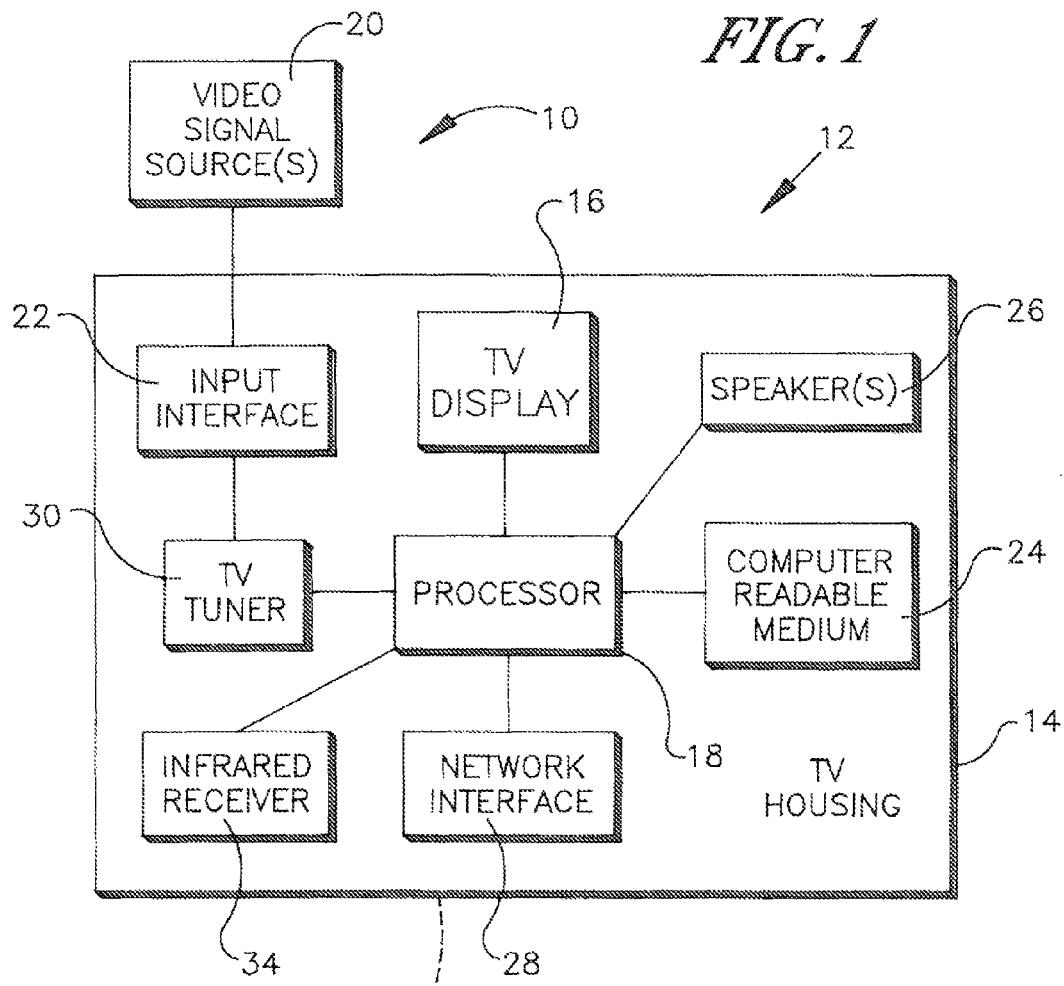
FIG. 1 is a block diagram of an example system according to present principles.

Now referring to FIG. 1, a system 10 includes a TV 12 defined by a TV chassis 14 holding a video display 16, such as but not limited to a high definition TV (HDTV) video screen. Under control of a TV processor 18, the display 16 presents video from a video source 20 received through an input interface 22. Without limitation, the video source 20 can include one or more of a set top box (STB), a satellite dish box, a terrestrial broadcast antenna, and the input interface(s) 22 are correspondingly configured to receive video signals from the source. Yet again, the video source may be personal video recorder (PVR), disk player, etc., in which case the input interface 22 may be a high definition multimedia interface (HDMI).

As shown in FIG. 1, the TV processor 18 accesses a computer readable storage medium 24 which may be disk storage, solid state storage, or a combination of the two, or any other data storage device (except a carrier wave per se) configured for storing logic embodying present principles. Audio received from the video source 20 may be played on one or more speakers 26, and in some embodiments the TV processor 18 may receive information including streaming Internet video through a network interface 28 such as a wired or wireless modem or wireless telephony transceiver. Input video signals may pass through a TV tuner 30 and thence to the TV processor 18 if desired. The TV processor 18 may receive user command signals from a hand held remote control (RC) 32 through an appropriate interface such as but not limited to an infrared (IR) receiver 34. The command signals may include channel up/down commands, volume up/down commands, and trick play commands, such as "pause", "slow play", and the like to cause the video to pause as a freeze frame on the display 16 or play at a slower than normal speed, respectively.

Figure 2:
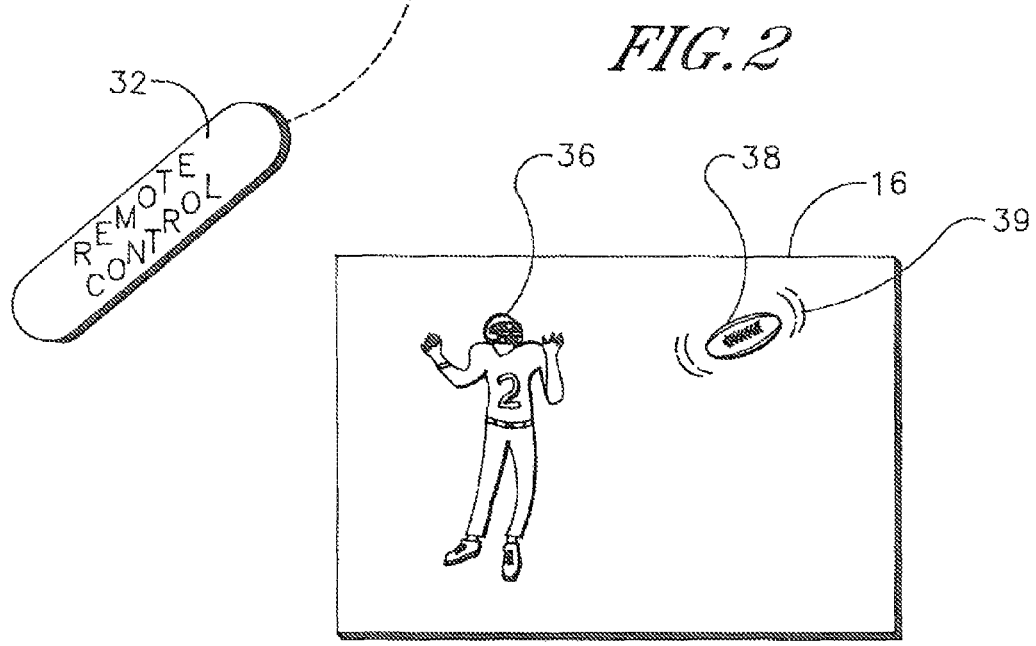
FIG. 2 is a screen shot of an example motion-blurred video.

Now referring to FIG. 2, the result of present principles may be appreciated. FIG. 2 is a screen shot of video being played at normal speed, typically thirty frames per second. As shown, a first moving object 36—in this case, a football player, is shown, as is a second moving object 38, in this case, an American football in flight to a receiver. As set forth further below, the player 36 is moving but is associated with motion vectors indicating that he is moving at less than a threshold speed, while the football 38 likewise is moving but at faster than the threshold speed. Accordingly, the image of the football 38 is blurred as indicated by the motion blur lines 39, shown in front and back of the football for illustration purposes only. If desired, the contrast or brightness of the football 38 may also be increased relative to that of the player 36. In addition or alternatively, a glow can be applied around the football 38 so that the viewer can have an easier time tracking it. The glow may be effected by increasing the brightness of the periphery of the football 38, or by generating a second periphery marginally larger than the football's true periphery and shown spaced just outside the true periphery with a brightness that is increased relative to the brightness with which the true periphery is presented.

Figure 3:
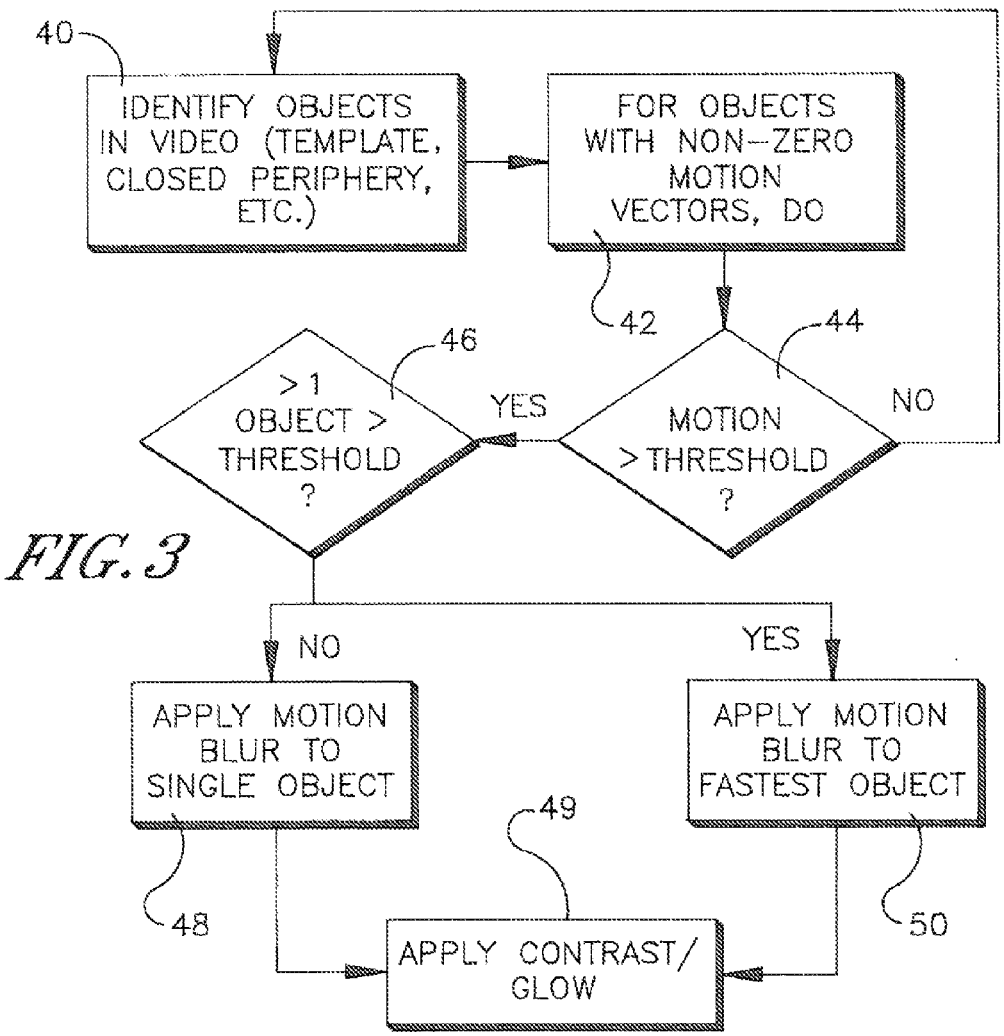
FIG. 3 is a flow chart of example motion blurring logic.

Now referring to FIG. 3, which illustrates logic that may be executed by the TV processor 18 accessing the storage medium 24 or by a processor of the video source 20 in some implementations, at block 40 discrete objects are identified in the video. The objects may be identified by matching objects to a template object, e.g., by determining whether an object in video has the same shape as a template football or tennis ball or other predetermined shape. Or, the discrete objects may be identified on the basis of having closed peripheries of any shape. Yet again, discrete objects may be identified by identifying groups of pixels having identical motion vectors, inferring that such groups of pixels are moving in unison at the same speed and direction and thus must represent a discrete single object.

At block 42, for objects in the video that are moving as indicated by, e.g., determining that the objects have non-zero motion vectors associated with them, it is determined at decision diamond 44 whether an object's motion satisfies a threshold velocity. This may be determined by determining whether the object's motion vector has a magnitude at least equal or greater than a threshold magnitude.

Responsive to determining that at least one object has a motion satisfying a threshold, the logic moves to decision diamond 46 to determine if multiple objects are moving sufficiently fast to merit motion blur application. If only one object is found to satisfy the velocity threshold, motion blur is applied to that object at block 48 according to principles such as but not limited those set forth in the above-referenced patent, with the exception that motion blur is applied only to the object exceeding the velocity criteria and not to other objects in video that do not meet the criteria at decision diamond 44.

If desired, the amount of motion blurring may be varied according to the velocity of the object. Thus, for instance, an object that is moving with a speed just at the threshold may have a first, relatively small motion blur effect applied, while an object that is moving with a speed significantly above the threshold may have a second, relatively large motion blur effect applied. Variable motion blurring may be effected by multiplying the output motion blur by a factor that varies linearly with the velocity of the object.

If, on the other hand, the processor determines that multiple objects satisfy the threshold at decision diamond 46, the logic moves to block 50 to apply motion blur to the fastest moving object only. In other embodiments, motion blur is applied to all objects satisfying the threshold. Contrast embellishment and/or glow may be applied to the object or objects meeting the velocity threshold at block 49 if desired according to principles above.

Figure 4:
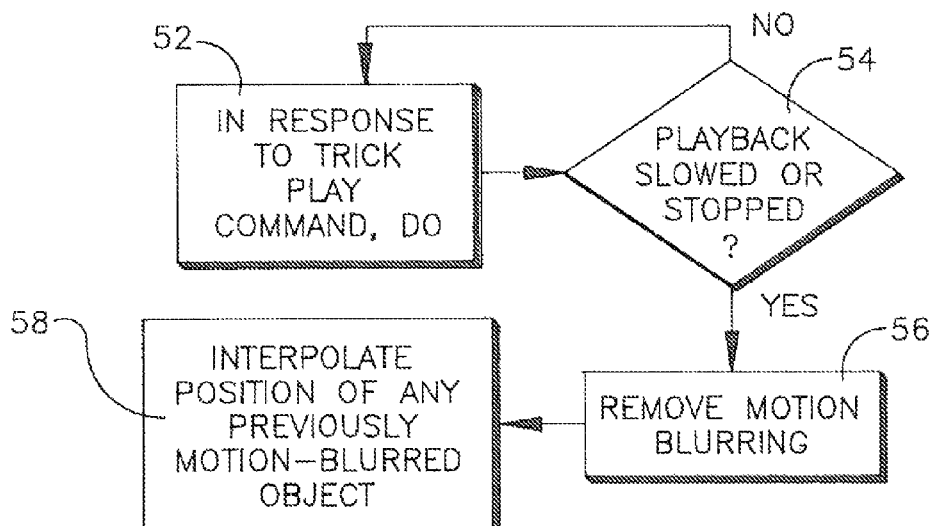
FIG. 4 is a flow chart of example trick play logic.

FIG. 4 shows that responsive to a trick play command received at block 52, the processor determines, at decision diamond 54, whether the command is to stop or slow playback to slower than normal, e.g., to under thirty frames per second. If so, motion blurring that may have been applied by the logic of FIG. 3 is removed at block 56 until such time as playback is resumed at normal speed. Also, since motion blurring may involve layering intermediate artificially generated frames into the video and moving those frames relative to the original frames they border, at block 58 the position of the object, now with motion blur removed, can be interpolated to be essentially the middle of the previously Motion-blurred object.

While the particular APPLYING MOTION BLUR TO ONLY SELECT OBJECTS IN VIDEO is herein shown and described in detail, it is to be understood that the subject matter which is encompassed by the present invention is limited only by the claims.

What is claimed is:

1. System comprising:
   processor configured for controlling a video display and configured to execute logic to distort an appearance of at least one object presented in video on the display, the processor programmed to execute logic comprising:
   identifying at least one object in the video having motion satisfying a threshold; and
   distorting an appearance of the object by increasing a distortion of the appearance of the object to simulate high speed motion thereof responsive to a determination that the motion of the object satisfies the threshold, and not distorting appearances of objects in the video whose motions do not satisfy the threshold, wherein the processor is programmed to identify objects in the video by matching objects to at least one template object.

2. The system of claim 1, wherein the processor is programmed to determine that an object in the video has motion satisfying the threshold by determining that the object has a motion vector with a magnitude at least equal to a threshold magnitude.

3. The system of claim 1, wherein responsive to determining that at least one object has a motion satisfying the threshold, the processor is programmed to determine whether multiple objects are moving sufficiently fast to merit motion blur application, and responsive to a determination that only a first object is found to satisfy the threshold, motion blur is applied to the first object and not to other objects in the video.

4. The system of claim 3, wherein an amount of motion blurring is varied according to a velocity of the first object, such that the first object when moving with a speed just at the threshold has a first, relatively small motion blur effect applied, and the first object when moving with a speed above the threshold has a second, relatively large motion blur effect applied.

5. The system of claim 3, wherein responsive to a determination that a trick play command to stop or slow playback to slower than normal playback is received, the processor is programmed to remove motion blurring of the first object.

6. The system of claim 3, wherein responsive to a determination that a trick play command to stop or slow playback to slower than normal playback is received, the processor is programmed to determine a position of the object to be an interpolated position for display of the object at the interpolated position.

7. The system of claim 1, wherein responsive to determining that at least one object has a motion satisfying the threshold, the processor is programmed to increase a contrast of a periphery of the object, or cause the object to have a glowing appearance, or both increase the contrast of the periphery of the object and cause the object to have a glowing appearance.

8. System comprising:
   processor configured for controlling a video display and configured to execute logic to distort an appearance of at least one object presented in video on the display, the processor programmed to execute logic comprising:
   identifying at least one object in the video having motion satisfying a threshold; and
   distorting an appearance of the object by increasing a distortion of the appearance of the object to simulate high speed motion thereof responsive to a determination that the motion of the object satisfies the threshold, and not distorting appearances of objects in the video whose motions do not satisfy the threshold, wherein the processor is programmed to identify objects in the video on the basis of having closed peripheries of any shape.

9. System comprising:
   processor configured for controlling a video display and configured to execute logic to distort an appearance of at least one object presented in video on the display, the processor programmed to execute logic comprising:
   identifying at least one object in the video having motion satisfying a threshold; and
   distorting an appearance of the object by increasing a distortion of the appearance of the object to simulate high speed motion thereof responsive to a determination that the motion of the object satisfies the threshold, and not distorting appearances of objects in the video whose motions do not satisfy the threshold, wherein the processor is programmed to identify objects in the video by identifying groups of pixels having identical motion vectors, inferring that such groups of pixels are moving in unison at the same speed and direction and thus represent a discrete single object.

10. Method comprising:
    presenting, on a video display, a first moving object;
    presenting on the video display, a second moving object;
    the second moving object moving with motion vectors indicating that the second moving object is moving at a second speed less than a threshold speed;
    the first moving object moving at a first speed faster than the threshold speed;
    blurring an image of the first moving object but not blurring the image of the second moving object responsive to a determination of a relationship between the threshold speed and first and second speeds.

11. The method of claim 10, comprising increasing a contrast or brightness or both the contrast and brightness of the second moving object relative to that of the first moving object responsive to the determination of the relationship between the threshold speed and first and second speeds.

12. The method of claim 10, comprising applying a glow around the first moving object but not the second moving object responsive to the determination of the relationship between the threshold speed and first and second speeds.

13. The method of claim 12, wherein the glow is effected by increasing the brightness of a periphery of the first moving object.

14. The method of claim 12, wherein the glow is effected by generating a second periphery marginally larger than the periphery of the first moving object and shown spaced just outside the periphery of the first moving object with a brightness that is increased relative to a brightness with which the periphery of the first moving object is presented.

15. Apparatus comprising:
    processor configured for controlling a video display and applying increased motion blur to at least one select object in a video presented on the display but not applying increased motion blur to objects in the video other than the select object, wherein the processor is configured to increase a contrast of the select object relative to a contrast of other objects in the video responsive to a determination that the select object is moving in the video at a speed that satisfies a threshold speed.

16. The apparatus of claim 15, wherein the processor is configured to apply motion blur to the select object responsive to a determination that the select object is moving in the video at a speed that satisfies a threshold speed.

17. The apparatus of claim 15, wherein responsive to a user command to slow video presentation to less than a normal playback speed, the processor is configured to remove motion blur from the select object.

18. Apparatus comprising:
processor configured for controlling a video display and applying increased motion blur to at least one select object in a video presented on the display but not applying increased motion blur to objects in the video other than the select object, wherein the processor is configured to apply a glow around the select object responsive to a determination that the select object is moving in the video at a speed that satisfies a threshold speed.

* * * * *